US007924427B2

(12) United States Patent
Tazartes et al.

(10) Patent No.: US 7,924,427 B2
(45) Date of Patent: Apr. 12, 2011

(54) PHOTONIC CRYSTAL BASED ROTATION SENSOR

(75) Inventors: Daniel A. Tazartes, West Hills, CA (US); Kenneth D. Marino, Brentwood, CA (US)

(73) Assignee: Northrop Grumman Guidance & Electronics Company, Los Angeles, CA (US)

( * ) Notice: Subject to any disclaimer, the term of this patent is extended or adjusted under 35 U.S.C. 154(b) by 204 days.

(21) Appl. No.: 11/528,133

(22) Filed: Sep. 27, 2006

(65) Prior Publication Data

US 2008/0074673 A1 Mar. 27, 2008

(51) Int. Cl.
*G01C 19/72* (2006.01)
(52) U.S. Cl. ...................................................... 356/460
(58) Field of Classification Search .................. 356/460, 356/461, 465
See application file for complete search history.

(56) References Cited

U.S. PATENT DOCUMENTS

| 5,526,449 | A | * | 6/1996 | Meade et al. | 385/14 |
| 5,781,301 | A | * | 7/1998 | Ruffin | 356/465 |
| 6,566,155 | B1 | | 5/2003 | Numai | |
| 6,885,456 | B2 | * | 4/2005 | Hashimoto | 356/465 |
| 2003/0011775 | A1 | * | 1/2003 | Soljacic et al. | 356/450 |
| 2003/0030814 | A1 | | 2/2003 | Osinski et al. | |
| 2004/0263856 | A1 | | 12/2004 | Willig et al. | |
| 2006/0103851 | A1 | | 5/2006 | Nathan et al. | |
| 2006/0145063 | A1 | | 7/2006 | Steinberg et al. | |
| 2007/0263224 | A1 | * | 11/2007 | Keyser et al. | 356/461 |

FOREIGN PATENT DOCUMENTS

EP 1 391 693 2/2004

OTHER PUBLICATIONS

Steinberg, Ben Zion; "Rotating Photonic Crystals: A Medium for Compact Optical Gyroscopes"; Physical Review E 71, 056621; The American Physical Society; pp. 056621-1-056621-7; May 2005.

* cited by examiner

*Primary Examiner* — Patrick J Connolly

(57) ABSTRACT

A gyroscope having photonic crystals for sensing rotation uses the Sagnac effect to determine angular motion. The gyroscope comprises a photonic crystal capable of guiding counter-propagating light beams in a closed path. A light source, coupling, and detection apparatus permits detection of phase changes between the counter-propagating beams, thereby permitting measurement of angular rotation. The photonic crystal comprises a periodic structure of pillars and voids which creates a photonic bandgap waveguide within which light waves in the proper wavelength range propagate with low loss.

8 Claims, 5 Drawing Sheets

PHOTONIC CRYSTAL BASED ROTATION SENSOR

BACKGROUND OF THE INVENTION

1. Field of the Invention

The invention relates generally to rotational sensors. More particularly, the invention relates to rotational sensors that sense rotation rate using an optical medium.

2. Description of the Related Art

Those concerned with the development of rotation sensors have long recognized the need for inexpensive solid state optical rotation sensors. The present invention fills this need.

A classic rotation sensing apparatus consists of two spinning mass gyroscopes mounted on perpendicular axes of a three axis gimbaled platform. The gyroscopes stabilize the platform in inertial space. The angular position of the body housing the apparatus can then be measured at the gimbals. Digital computers create an alternative to the gimbaled platform, and angular position can be calculated by integrating angular rate information derived from torque measurements on spinning mass gyroscopes. Rotation sensing devices that feature spinning mass gyroscopes have drawbacks related to wear, maintenance and start-up time. Weight, size, precession, and cost further limit the use of a spinning mass gyroscope. In recent years, gyroscopes based on other technologies have replaced spinning mass gyroscopes in many applications.

The ring laser gyroscope has become the gyroscope of choice for many applications because it requires no moving parts. A ring laser gyroscope consists of a transmission path in the form of a two dimensional polygon, often a triangle, or rectangle. Mirrors at each of the corners of the polygon reflect laser light down the legs of the polygon forming a ring-like transmission path. Laser light is generated in the transmission path using an electrical discharge applied to a suitable gas mixture. Due to symmetry, laser light propagates through the transmission path in both directions.

The Sagnac effect is used to determine rotational rate. When the gyroscope is rotating around an axis normal to the transmission path, laser light traveling through the transmission medium in opposite directions will have different path lengths and the frequencies of the two standing waves will differ. The beat between these two frequencies is measured, giving a result proportional to the rotation rate of the device. Ring laser gyros offer some improvements in cost, accuracy and reliability over classic spinning mass gyroscopes but still suffer from many drawbacks including the need for quality glass machined cavities, precision mirrors, high voltage lasers, and inert gases. Weight, size, cost and complexity also limit the applications for which a ring laser gyroscope would be a suitable choice.

Another optical gyroscope is the fiber optic gyroscope. The fiber optic gyroscope is similar to the ring laser gyroscope in that it uses an optical transmission path (fiber optic cable) to exploit the Sagnac effect. An optical coupler (a beam splitter) is used to introduce coherent light into both ends of a coiled optical fiber. When the optical gyroscope is rotated about an axis normal to the coils the path length of light traveling in one direction will be longer than the path length of light traveling in the other direction inducing an apparent phase shift in the light arriving at the ends of the fiber. A phase interferometer located at the ends of the fiber combines the light. Through appropriate processing of the intensity of the combined light, the rotation rate of the fiber may be determined. Fiber optic gyroscopes are generally less expensive, smaller, and lighter than ring laser gyroscopes. Weight, size, and cost also limit the applications suitable for fiber gyroscopes.

Some efforts have been made to incorporate gyroscopes into solid state electronics using Micro-Electromechanical Systems (MEMS) technologies. Some MEMS gyroscopes include the piezoelectric gyroscope, the tuning fork gyroscope and the vibrating wheel gyroscope. They are characterized by a vibrating element that exploits the Coriolis force. These gyroscopes are light in weight and less costly than other conventional gyroscopes but in general suffer from larger drift rates, higher failure rates and are less accurate making them unsuitable for many applications. Although, MEMS technologies offer considerable cost savings over other technologies, their accuracies and inherent reliance on vibratory motion preclude their use for gyroscopes for most applications.

Those concerned with the development of gyroscopes have long recognized the need for ever smaller, more accurate and inexpensive gyroscopes. The present invention significantly advances the prior art by offering a gyroscope based on a relatively new technology that enables the mass production of small accurate gyroscopes.

SUMMARY OF THE INVENTION

The present invention, (hereinafter the gyroscope) comprises a photonic crystal arranged to guide light of a certain wavelength range along a pre-defined closed path. The photonic crystal is characterized by a periodic structure modified by deliberate "imperfections" (pillars) which form a waveguide. The periodic structure may be uniform rows of pillars and the imperfections could be "missing" pillars in the appropriate arrangement. The section where pillars are missing forms the waveguide. The reflective properties of the periodic pillars are used to guide and confine coherent or laser light through the waveguide.

A beam of light is split into a first beam traveling through the waveguide in one direction and a second beam of light traveling through the waveguide in an opposite direction. The phase angles or the frequencies of the first and second beams are compared at the end or the ends of the waveguide. They will be identical if the waveguide is not rotating around an axis normal to the plane of the waveguide transmission path. If the waveguide is rotating, the frequency and phase will be proportionally offset by the rotation rate about the axis. In this way the gyroscope senses rotation rate about the axis normal to the gyroscope.

The gyroscope can be manufactured using conventional semiconductor equipment and manufacturing techniques. The use of standard equipment to mass produce a solid state optical gyroscope offers considerable cost advantages over the conventional ring laser gyroscope and fiber optic gyroscope. The gyroscope has no moving parts making it inherently more reliable. The inherent properties of photonic crystals also allow "hairpin" turns in the light path and offer more flexibility in light path topology design.

The gyroscope also offers an alternative to current MEMS technologies. The gyroscope uses the Sagnac effect rather than the Coriolis effect used by MEMS gyroscopes, obviating the need for a vibrating member. This makes the gyroscope less susceptible to external shock or vibration. When used in conjunction with an inexpensive light source the gyroscope requires very little power.

BRIEF DESCRIPTION OF THE DRAWINGS

The exact nature of this invention as well as its objects and advantages will be readily understood upon consideration of the following specification as related to the attendant drawings wherein like reference numerals throughout the drawings indicate like parts, and wherein.

DESCRIPTION OF THE PREFERRED EMBODIMENTS

Figure 1:
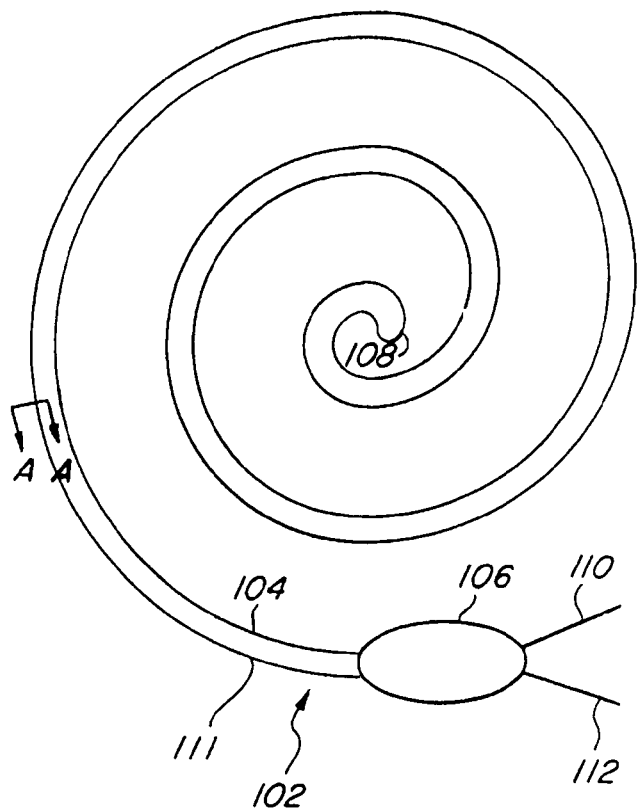
FIG. 1 is schematic illustration of a top view of a preferred embodiment of the present invention.

FIG. 1 shows an elongated two dimensional photonic crystal (hereinafter waveguide) 102 wrapped in a double spiral in a single plane. A first spiral 104 extends from a coupler 106 to a midpoint 108 and is characterized by a decreasing radius of curvature. A second spiral 111 extends from the coupler 106 to the midpoint 108 in a winding almost parallel to the first spiral. A first light path 110 guides coherent or laser light into the coupler. A second light path 112 guides light out of the coupler.

The first and second light paths 110, 112 are preferably composed of optical fiber for conducting coherent light. Air or an inert gas may be used for the laser light. However, any light translucent medium may be used.

Coupler 106 is a coupler acting as a beam splitter for light introduced into the waveguide 102 and a combiner for light departing the waveguide. However, the coupler may comprise a number of different optical devices such as optical beam splitters, combiners, circulators or Bragg gratings, for example.

The midpoint 108 is characterized by a sharp turn in the waveguide. The waveguide 102 may feature pillars (explained hereinafter) that propagate light around turns with very little loss of efficiency or scattering. Alternately, the midpoint 108 may be manufactured with a reflecting structure such as a Bragg grating.

Figure 2:
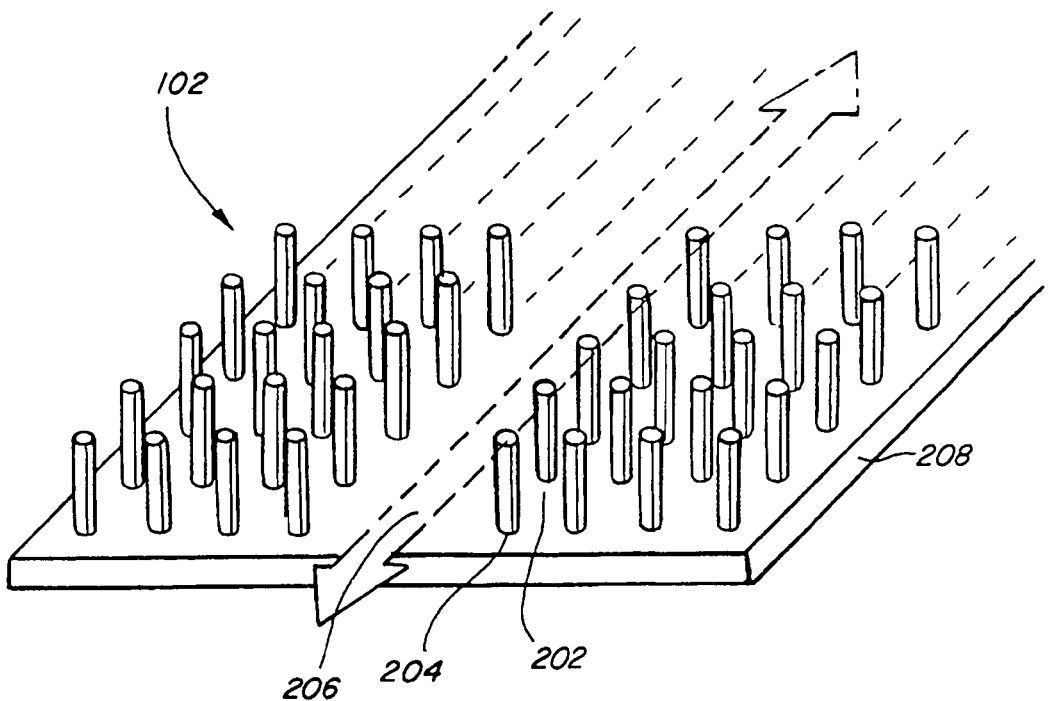
FIG. 2 is a cross section of FIG. 1 taken along the line A-A.
Figure 2:
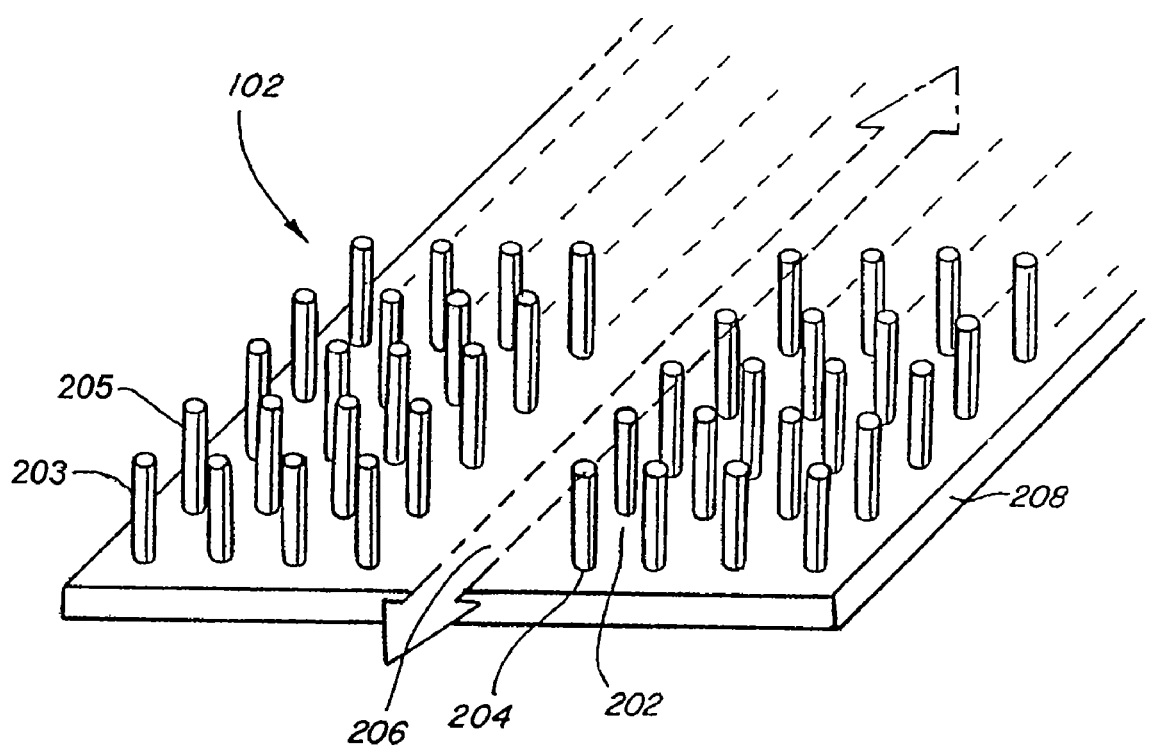

FIG. 2 shows the cross section of the waveguide taken along line A-A. The waveguide 102 has a perimeter that features voids 202 and silicon pillars 204. The pillars alternate in a checkerboard pattern surrounding an air filled light channel 206. The pillars have spacing approximately equal to one half the wavelength of the light (explained hereinafter) to be propagated through the light channel 206. The pillars are constructed on a photonic crystal slab substrate 208 in a multistage deposition and etching process using a silicon oxide mask or other similar process. Slab substrate 208 supports the pillars in a stable arrangement.

Alternate embodiments utilize alternating pillars of different materials. For example, the waveguide 102 may be constructed by alternating pillars of gallium arsenide and aluminum oxide. The waveguide 102 may be constructed with alternating pillars of materials having different refractive indexes. The pillars may be cylindrical in shape, or have any other shape that creates a photonic bandgap. A slab may be joined to the tops of the pillars to provide full three dimensional containment. The waveguide may be constructed by any conventional manufacturing process, including semiconductor manufacturing processes. Alternative photonic crystals using properly alternating structures of dielectric (e.g., first dielectric material 203 and second dielectric material 205) may also be used. In this case, the periodic structure is parallel to the waveguide and the waveguide itself is formed by a longitudinal defect structure. Such a photonic structure may be three dimensional effectively forming a tube waveguide in which the light waves may be guided through a longitudinal void or cavity within the crystal structure.

Figure 3:
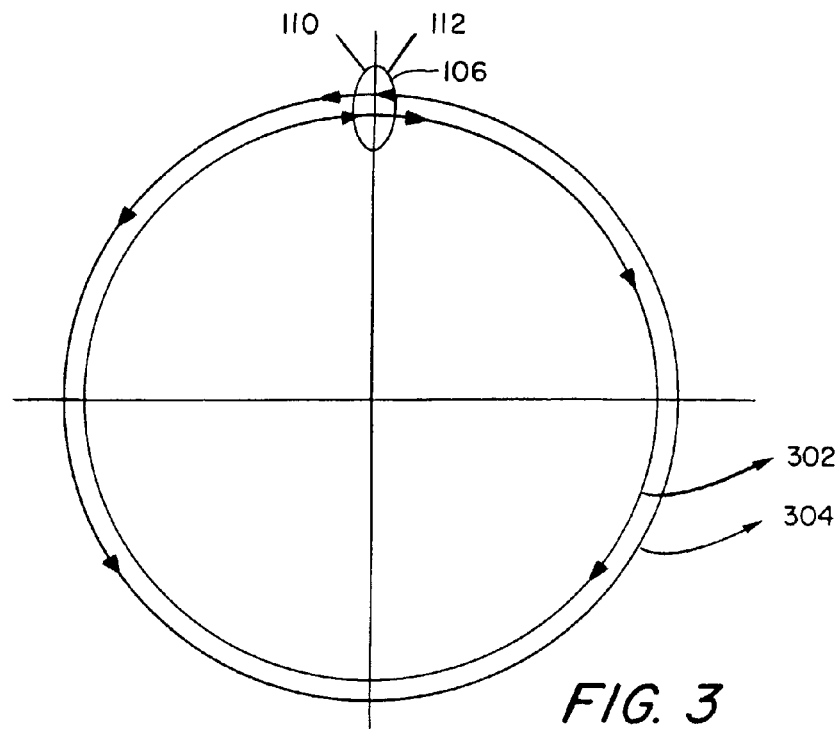
FIG. 3 is a diagram illustrating the light path in a preferred embodiment of the present invention.

FIG. 3 shows collimated light traveling through a circular embodiment of the gyroscope. The gyroscope is not rotating around an axis normal to the gyroscope (an axis coming out of the paper). Light from the first light path 110 enters the coupler 106 and is split into a clockwise rotating light beam 302 and a counterclockwise rotating light beam 304. The light travels through the light channel 206 with both light beams arriving at the coupler 106 with identical frequencies and phases. Mixed light exiting the coupler 106 through the second light path 112 will have a constant intensity.

The light traveling through the gyroscope may have a wavelength of 1550 nm in order to make light compatible with erbium doped amplifiers which allow light amplification without the need for electrical transduction. A frequency of 980 nm may also be used to allow the use of super luminous diodes as a light source. However, any convenient light frequency may be used. The use of laser light as well as collimated light is also contemplated.

Figure 4:
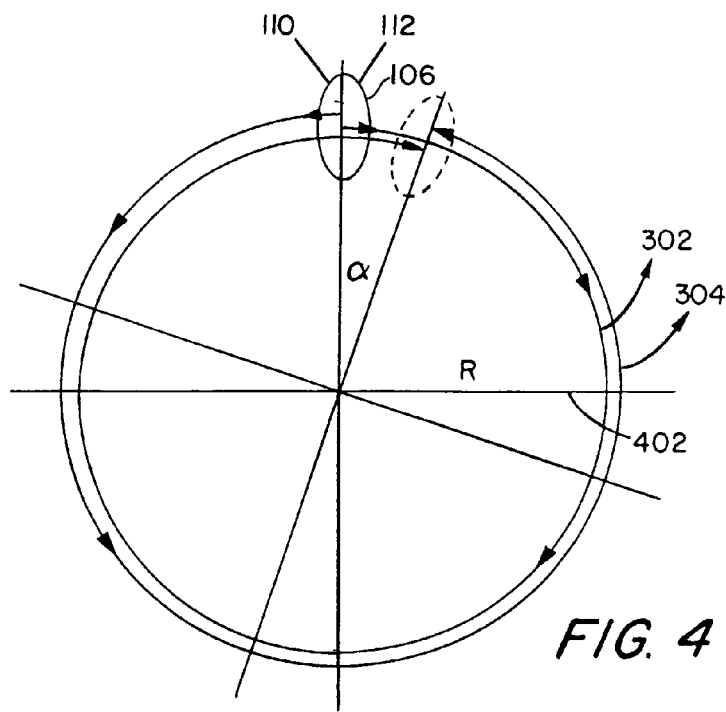
FIG. 4 is a diagram illustrating the light path when the gyroscope of FIG. 3 is rotating.

FIG. 4 shows light in a rotating gyroscope. Light from the first light path 110 enters the coupler 106 and is split into a clockwise rotating light beam 302 and a counterclockwise rotating light beam 304. As the light travels through the channel the gyroscope rotates through an angle $\alpha$. The clockwise rotating light beam 302 will travel an arc length $(2\pi+\alpha)R$ before arriving at the coupler 106 while the counterclockwise rotating light beam 304 will travel an arc length of $(2\pi-\alpha)R$. Light arriving at the coupler from the counter rotating beams will be out of phase. Mixed light departing through light path 112 will have intensity indicative of the phase difference and hence the rotation angle.

Figure 5:
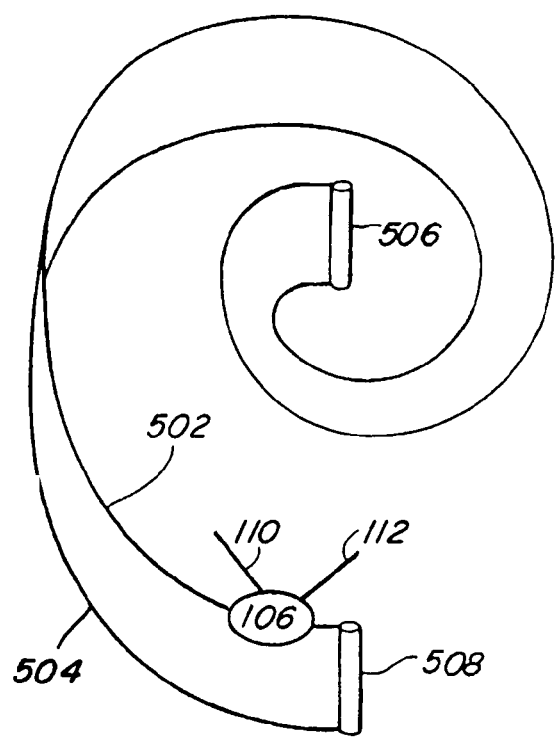
FIG. 5 is a schematic illustration of a third preferred embodiment of the invention.

FIG. 5 shows a double spiral waveguide. The waveguide 102 features two spirals connected via feed-through holes. A first spiral 502 is characterized by a monotonically decreasing radius of curvature. A second spiral 504 identical to the first spiral is located in a parallel plane. A first feed through hole 506, at one end of the first spiral 502, extends to the corresponding end of the second spiral 504. A second feed through hole 508, at the other end of the spiral 502, extends from the first spiral 502 to the second spiral 504. A coupler 106 in the first spiral 502 launches light in opposite directions. A first light path 110 guides coherent or laser light into the coupler. A second light path 112 guides light out of the coupler. Preferably the parallel planes defined by the first spiral and the second spiral are separated by a very small distance to avoid sensing rotation rates normal to the feed through holes 506 508.

Figure 6:
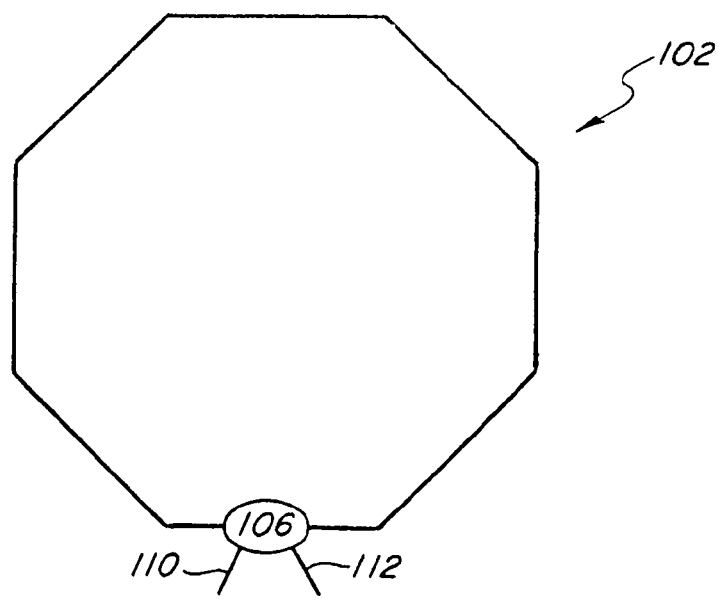
FIG. 6 is a schematic illustration of a top view of a fourth preferred embodiment of the invention.

FIG. 6 shows a polygon shaped waveguide. The waveguide 102 features a series of legs 302 joined at the edges to form a substantially octagon shaped structure. A coupler 106 interrupts one of the legs to allow ingress and egress of light. Light in the first light path 110 is coupled into the waveguide 102 through the coupler 106. Light within the waveguide is also coupled out to the second light path 112 through the coupler 106.

Figure 7:
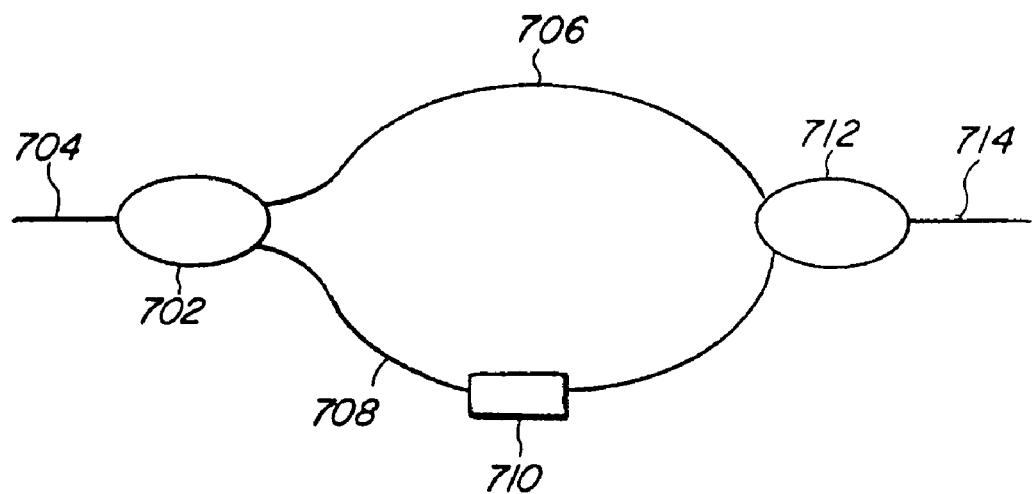
FIG. 7 is a schematic illustration of a top view of a fifth preferred embodiment of the invention.

FIG. 7 shows the waveguide of the present invention in a Mach Zender configuration. A first coupler 702 splits light from an entry path 704 into a first light beam that travels along a reference light path 706 and a second light beam that travels along an interference path 708. Both light paths are photonic crystal waveguides identical in structure to the waveguide 102. They feature alternating pillars 202, 204 of materials forming photonic bandgaps that surround a light channel 206 (FIG. 2). The interference path has an adjustment device 710 in its light path. The adjustment device 710 can be adjusted to stress or distress the interference path 708, slightly increasing or decreasing the path length. The reference light path 706 and the interference path 708 terminate in a second coupler 712 that combines light from the paths. The combined light departs through an exit path 714. By using the adjustment device 710, the relative phase angles of light arriving at the second coupler can be adjusted to change the intensity of the light departing through the exit path 714.

The adjustment device 710 may be constructed of a compliant material. The waveguide then becomes a pressure sensor. The adjustment device 710 may be constructed of a material with a refractive index sensitive to electromagnetic fields, making the device an antenna. The adjustment device 710 may be a gap in the interference path, making the device a gas sensor. The adjustment device 710 may be a different structure from reference path 708, or may be just a continuation of the reference path. For example, the reference path 708 may be constructed entirely of compliant materials making the path inherently a pressure sensor.

Figure 8:
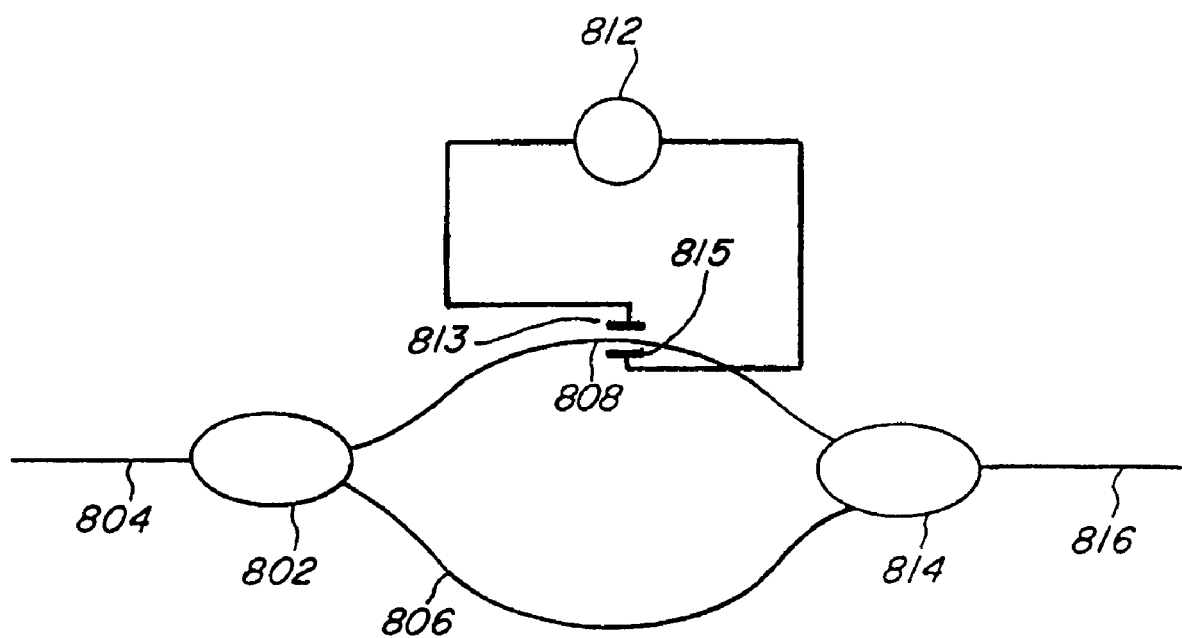
FIG. 8 is a schematic illustration of a top view of a sixth preferred embodiment of the invention.

FIG. 8 shows the waveguide of the present invention used as a light modulator. A first coupler 802 splits light from an entry path 804 into a first beam that travels through a reference light path 806 and a second beam that travels through a refraction path 808. Both light paths are photonic waveguides identical in structure to waveguide 102. They also feature alternating pillars 202, 204 of material that form photonic bandgaps around a light channel 206 (FIG. 2). At least one of the alternating pillars of material has a diffractive index sensitive to magnetic fields or electric fields. For example Lithium Niobate exhibits sensitivity to electric fields. Electrodes 813 and 815 powered by power source 812 are located near the refraction path. The reference light path 806 and the interference path 808 terminate in a second coupler 814 combining light traveling through the paths. The combined light departs through an exit path 816.

The amplitude or frequency coming from the power source 812 is adjusted to change the intensity of the electric field around electrodes 813 and 815 thereby changing the refractive index of the pillars 204 in the refraction path 808. The change in refractive index alters the path of the beam of light traveling through the refraction path modulating the mixed light departing through the exit path. Similarly, this effect may be induced with a magnetic field coil substituting for electrodes 813 and 815, and using a material whose index of refraction is sensitive to magnetic field in path 808.

What is claimed is:

1. A rotation sensor comprising:
    a light source;
    a coupler for splitting light from the light source into a first beam and a second beam;
    a first light guide having an introduction point and an end, the first light guide formed in a spiral shape and having a photonic crystal structure receiving the first beam at the introduction point of the first light guide, the photonic crystal structure of the first light guide being a plurality of pillars, positioned transverse to propagation of the first beam, and a pair of crystal slabs, for creating a predefined path for the first beam;
    a second light guide having an introduction point and an end, the second light guide formed in a spiral shape adjacent and concentric with the first light guide in the same plane as the first light guide, the second light guide having a photonic crystal structure receiving the second beam at the introduction point of the second light guide, the photonic crystal structure of the second light guide being a plurality of pillars, positioned transverse to propagation of the second beam, and a pair of crystal slabs, for creating a predefined path for the second beam; and
    a turn at the end of the first light guide connected to the end of the second light guide.

2. The sensor of claim 1 wherein a pair of adjacent pillars of the first light guide or the second light guide have refractive indices that alternate.

3. The rotation sensor of claim 1 wherein the photonic crystal structure of the first light guide or the second light guide has predefined geometric defects for guiding light in a particular range of wavelengths.

4. The rotation sensor of claim 1 wherein the light source produces collimated or coherent light.

5. The rotation sensor of claim 1, wherein the first light guide is adapted to allow sensing of the second beam at the introduction point of the first light guide.

6. The rotation sensor of claim 1 wherein the first light guide and second light guide are substantially in the form of a polygon.

7. The rotation sensor of claim 1 further comprising a transducer mounted at the introduction point of the first or second light guide to convert light intensity into a proportional electrical signal.

8. The rotation sensor of claim 1 further comprising a transducer mounted at the introduction point of the first or second light guide to convert light frequency or phase changes into an electrical signal.

* * * * *